(12) United States Patent
Li et al.

(10) Patent No.: US 11,804,053 B2
(45) Date of Patent: Oct. 31, 2023

(54) IMAGE RECOGNITION METHOD AND TERMINAL

(71) Applicant: Huawei Technologies Co., Ltd., Shenzhen (CN)

(72) Inventors: Changzhu Li, Shenzhen (CN); Xiyong Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 249 days.

(21) Appl. No.: 17/240,103

(22) Filed: Apr. 26, 2021

(65) Prior Publication Data

US 2021/0240982 A1 Aug. 5, 2021

Related U.S. Application Data

(63) Continuation of application No. 16/321,960, filed as application No. PCT/CN2016/092464 on Jul. 30, 2016, now Pat. No. 11,132,545.

(51) Int. Cl.
*G06K 9/00* (2022.01)
*H04N 9/475* (2006.01)
(Continued)

(52) U.S. Cl.
CPC ............ *G06V 20/70* (2022.01); *G06F 18/214* (2023.01); *G06F 18/24* (2023.01); *G06F 18/40* (2023.01);
(Continued)

(58) Field of Classification Search
CPC ............. H04N 9/475; H04N 5/04; G06K 9/00
USPC ....... 382/100, 103, 106–107, 156, 162, 268, 382/173, 181, 199, 209, 219, 224, 254, 382/274, 276, 286–291, 305, 157, 312; 348/515; 707/E17.022

See application file for complete search history.

(56) References Cited

U.S. PATENT DOCUMENTS 9,509,916 B2* 11/2016 Li ..................... H04N 23/635
2006/0251338 A1* 11/2006 Gokturk ................. G06F 18/22
707/E17.022

(Continued)

FOREIGN PATENT DOCUMENTS

CN 102591994 A 7/2012
CN 104103085 A 10/2014
(Continued)

OTHER PUBLICATIONS

Puglia Steven T. et al: "Excerpt from Technical Guidelines for Digitizing Archival Materials for Electronic Access," Jun. 2004, pp. 17-17, XP055961961.
(Continued)

*Primary Examiner* — Seyed H Azarian
(74) *Attorney, Agent, or Firm* — Conley Rose, P.C.

(57) ABSTRACT

An image recognition method and a terminal, where the method includes obtaining, by the terminal, an image file comprising a target object, recognizing, by the terminal, the target object based on an image recognition model in the terminal to obtain object category information of the target object, and storing, by the terminal, the object category information as first label information of the target object. Hence, image recognition efficiency of the terminal can be improved, and privacy of a terminal user can be effectively protected.

17 Claims, 10 Drawing Sheets

(51) Int. Cl.
*G06V 20/70* (2022.01)
*G06V 10/94* (2022.01)
*G06V 20/10* (2022.01)
*G06F 18/24* (2023.01)
*G06F 18/40* (2023.01)
*G06F 18/214* (2023.01)
*G06V 10/764* (2022.01)
*G06V 10/82* (2022.01)
*G06N 3/08* (2023.01)
*G06F 3/04842* (2022.01)

(52) U.S. Cl.
CPC ............ *G06N 3/08* (2013.01); *G06V 10/764* (2022.01); *G06V 10/82* (2022.01); *G06V 10/95* (2022.01); *G06V 20/10* (2022.01); *G06F 3/04842* (2013.01)

(56) References Cited

U.S. PATENT DOCUMENTS

| | | | |
|---|---|---|---|
| 2008/0159622 A1* | 7/2008 | Agnihotri | G06V 10/454 382/156 |
| 2014/0306999 A1 | 10/2014 | Yim et al. | |
| 2015/0170001 A1 | 6/2015 | Rabinovich et al. | |
| 2015/0178596 A1 | 6/2015 | Bengio et al. | |
| 2015/0213058 A1 | 7/2015 | Ambardekar et al. | |
| 2015/0324688 A1 | 11/2015 | Wierzynski et al. | |
| 2016/0065791 A1* | 3/2016 | Li | H04S 7/30 348/515 |
| 2017/0185873 A1* | 6/2017 | Wang | G10L 15/063 |
| 2019/0171876 A1* | 6/2019 | Segalovitz | G06V 30/40 |

FOREIGN PATENT DOCUMENTS

| | | |
|---|---|---|
| CN | 104573669 A | 4/2015 |
| CN | 104615769 A | 5/2015 |
| CN | 104715262 A | 6/2015 |
| CN | 104766041 | 7/2015 |
| CN | 105117399 A | 12/2015 |
| CN | 105528611 A | 4/2016 |

OTHER PUBLICATIONS

Yang Yang et al, "Image Auto-Annotation Based on Deep Learning," 2015, 11 pages.

* cited by examiner

IMAGE RECOGNITION METHOD AND TERMINAL

CROSS REFERENCE TO RELATED APPLICATIONS

This application is a continuation of U.S. patent application Ser. No. 16/321,960 filed on Jan. 30, 2019, which claims priority to a U.S. National Stage of International Patent Application No. PCT/CN2016/092464 filed on Jul. 30, 2016. Both of the aforementioned applications are hereby incorporated by reference in their entireties.

TECHNICAL FIELD

The present invention relates to the field of image recognition technologies, and in particular, to an image recognition method and a terminal.

BACKGROUND

Currently, a text file or an image file on the Internet needs to be labeled with at least one piece of label information due to miscellaneous information on the Internet, so as to perform classification management on the text file or the image file based on label information. With development of technologies such as computer vision (Computer Vision, CV), natural language processing (Natural Language Processing, NLP), and deep neural network (Deep Neural Network), the label information can be automatically labeled to the image file. When the label information is labeled to an image on a terminal, the image needs to be uploaded to a server. The server labels the image with the label information after performing image recognition and classification, and feeds back the labeled label information to the terminal. As a quantity of terminals gradually increases, a quantity of images that need to be processed by the server increases, and a workload of the server increases. Consequently, processing efficiency of labeling an image with label information is reduced. In addition, the terminal needs to upload the image to the server for label information labeling, and this is not conducive to protecting privacy of a terminal user.

SUMMARY

Embodiments of the present invention disclose an image recognition method and a terminal, so as to improve image recognition efficiency of the terminal, and effectively protect privacy of a terminal user.

A first aspect of the embodiments of the present invention discloses an image recognition method, including: obtaining, by a terminal, an image file comprising a target object; recognizing, by the terminal, the target object based on an image recognition model in the terminal to obtain object category information of the target object; and storing, by the terminal, the object category information as first label information of the target object.

It can be learned that the terminal obtains the image file including the target object, may recognize the target object in the image file based on the image recognition model in the terminal to obtain the object category information of the target object, and may store the object category information in the image file as the first label information. In the foregoing manner, the terminal may recognize the target object, so as to improve the image recognition efficiency of the terminal, and effectively protect the privacy of a terminal user.

A second aspect of the embodiments of the present invention discloses a terminal, and the terminal includes a processor configured to obtain an image file comprising a target object and recognize the target object based on an image recognition model in the terminal to obtain object category information of the target object, and a storage coupled to the processor and configured to store the object category information as first label information of the target object.

In the embodiments of the present invention, the terminal obtains the image file including the target object, may recognize the target object in the image file based on the image recognition model in the terminal to obtain the object category information of the target object, and may store the object category information as the first label information. In the foregoing manner, the terminal may recognize the target object so as to improve the image recognition efficiency of the terminal, and effectively protect the privacy of a terminal user.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make a person skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The "embodiments" mentioned in this specification means that specific characteristics, structures, or features described with reference to the embodiments may be included in at least one embodiment of the present invention. The phrase in each location in this specification does not necessarily refer to a same embodiment, or an independent or alternative embodiment mutually exclusive to the other embodiments. A person skilled in the art explicitly and implicitly understands that the embodiments described in this specification may be combined with other embodiments.

The following describes the technical solutions in the embodiments of the present invention with reference to the accompanying drawings in the embodiments of the present invention.

The embodiments of the present invention disclose an image recognition method, a terminal, and a system, so as to improve image recognition efficiency of the terminal, and effectively protect privacy of a terminal user.

To better understand the embodiments of the present invention, the following first describes an application scenario of the embodiments of the present invention. The application scenario in the embodiments of the present invention may be understood as a communications system applied in the method and apparatus embodiments of the present invention.

Figure 1:
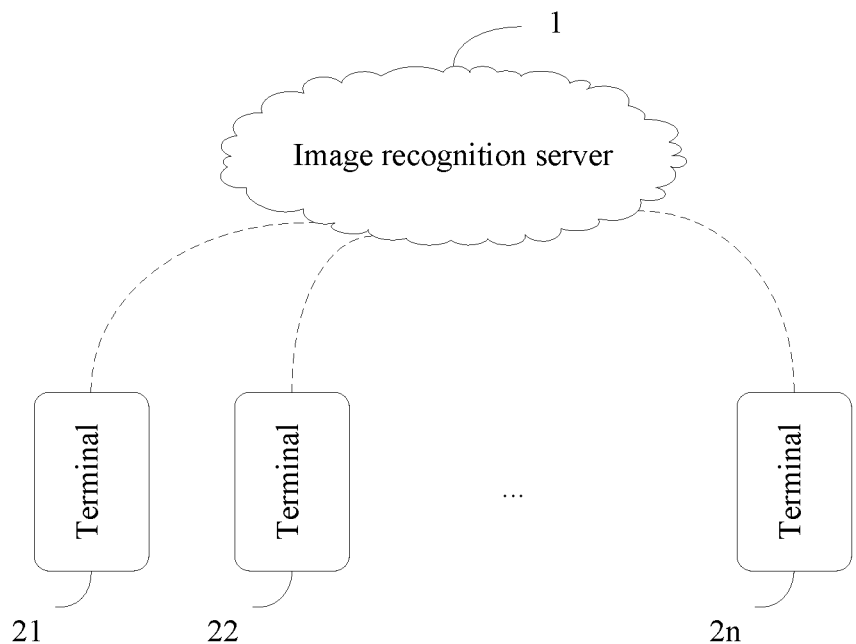
FIG. 1 is a schematic structural diagram of an image recognition system according to an embodiment of the present invention.

Referring to FIG. 1, FIG. 1 is a schematic structural diagram of an image recognition system in the prior art.

As shown in FIG. 1, the system includes an image recognition server 1 and n terminals 21 to 2n.

In a conventional technical solution of image recognition, after performing, by using a CV technology, an NLP technology, and the like, image recognition and classification on images uploaded by the terminal, the image recognition server 1 may label the uploaded images with label information, and may feed back the label information to the uploading terminal. After labeling an image with label information, the image recognition server may further revise the label information by means of manual calibration in a background, so as to increase accuracy of labeling an image with label information. That is, the image recognition server 1 may implement auto-labeling of an image with label information and manual labeling of an image with label information. However, as a quantity of terminals in the system increases, a workload of the image recognition server 1 increases, and processing efficiency of labeling an image with label information is low. If manual label information calibration needs to be performed in a background, costs of the maintaining the image recognition server 1 are further increased. In addition, because corresponding label information can be obtained only when the image in the terminal is uploaded, privacy of a terminal user cannot be effectively protected in the foregoing manner. Based on the system shown in FIG. 1, to resolve a technical problem with the foregoing conventional manner, the following describes in detail the method embodiments in the embodiments of the present invention. The terminal described in the embodiments of the present invention may include at least one of a handheld computer, a personal digital assistant, a cellular phone, a network application, a camera, a smartphone, an enhanced general packet radio service (EGPRS) mobile phone, a media player, a navigation device, an email device, a game console, or another data processing device.

Figure 2:
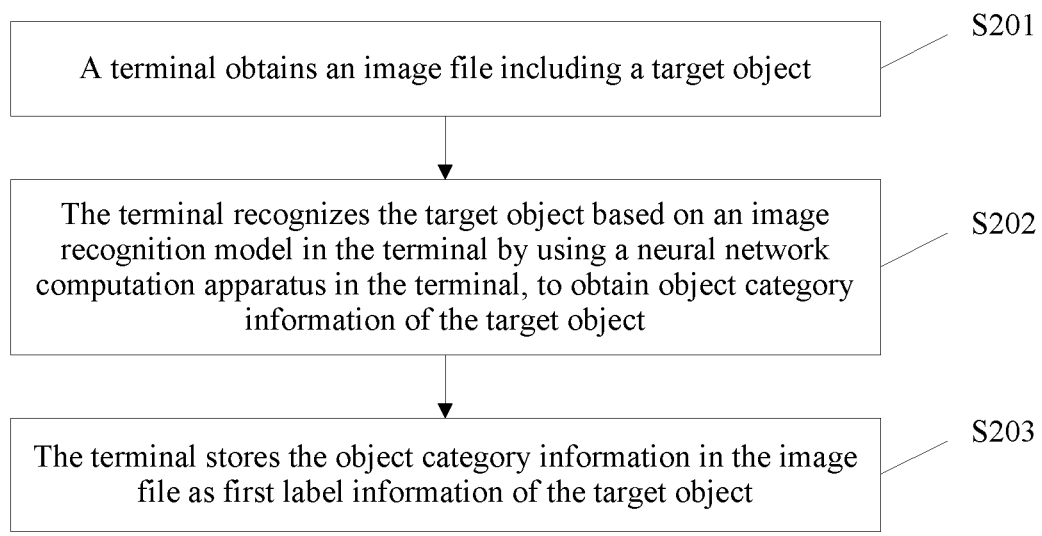
FIG. 2 is a schematic flowchart of an image recognition method according to an embodiment of the present invention.

Referring to FIG. 2, FIG. 2 is a schematic flowchart of an image recognition method according to an embodiment of the present invention. The method may be implemented by the terminal. As shown in FIG. 2, the method includes at least the following steps.

Step S201: The terminal obtains an image file including a target object.

In some feasible implementations, the terminal may obtain, from the image file or a video file, the image file including the target object; or the terminal may obtain, from another communications device that communicates with the terminal, the image file including the target object; or the terminal may extract the target object from an original image file or a video file, and generate a new image file including the target object; or the terminal uses a stored image file as the image file including the target object, and determines the target object in the image file based on a selection operation of a user.

The image file may include at least one target object. Optionally, the target object may be determined based on an operation performed on the image file by the user, or may be determined based on a target feature in the target object.

Step S202: The terminal recognizes the target object based on an image recognition model in the terminal by using a neural network computation apparatus in the terminal, to obtain object category information of the target object.

In some feasible implementations, after obtaining the image file including the target object, the terminal may recognize the target object based on the image recognition model in the terminal by using the neural network computation apparatus in the terminal, to obtain the object category information of the target object. Specifically, the image recognition model in the terminal may be built by a server. The server performs image recognition model training by collecting a plurality of types of image files, and pushes the trained image recognition model to the terminal. Alternatively, the terminal may build the image recognition model by using the neural network computation apparatus. After the terminal obtains the image file including the target object, the terminal may be triggered, based on a user instruction or in another manner, to invoke the image recognition model to recognize the target object, and obtain the object category information of the target object by using the foregoing image recognition model. The object category information may include text information such as an object category of the target object or an object name of the target object. The neural network computation apparatus is disposed on the terminal, so that image recognition efficiency of the terminal can be improved.

Step S203: The terminal stores the object category information in the image file as first label information of the target object.

In some feasible implementations, after the terminal recognizes the target object based on the image recognition model in the terminal, to obtain the object category information of the target object, the terminal stores the object category information in the image file as the first label information of the target object. The object category information of the target object obtained by using the image recognition model may be stored in the image file based on a preset label information format, so that the object category information is stored in the image file as the first label information. Optionally, the first label information may be stored in an extension segment or a comment segment of the image file. Optionally, the terminal may label the target object based on the first label information, or may determine more detailed second label information based on the first label information, so as to label the target object based on the second label information. Optionally, the terminal may further receive a user operation of revising the foregoing stored first label information, or may upload the first label information to the server for sharing. This embodiment of the present invention imposes no limitation herein.

It can be learned that the terminal obtains the image file including the target object, may recognize the target object in the image file based on the image recognition model in the terminal by using the neural network computation apparatus in the terminal, to obtain the object category information of the target object, and may store the object category information in the image file as the first label information. In the foregoing manner, the terminal may recognize the target object by using the neural network computation apparatus in the terminal, so as to improve the image recognition efficiency of the terminal, and effectively protect privacy of a terminal user.

Figure 3:
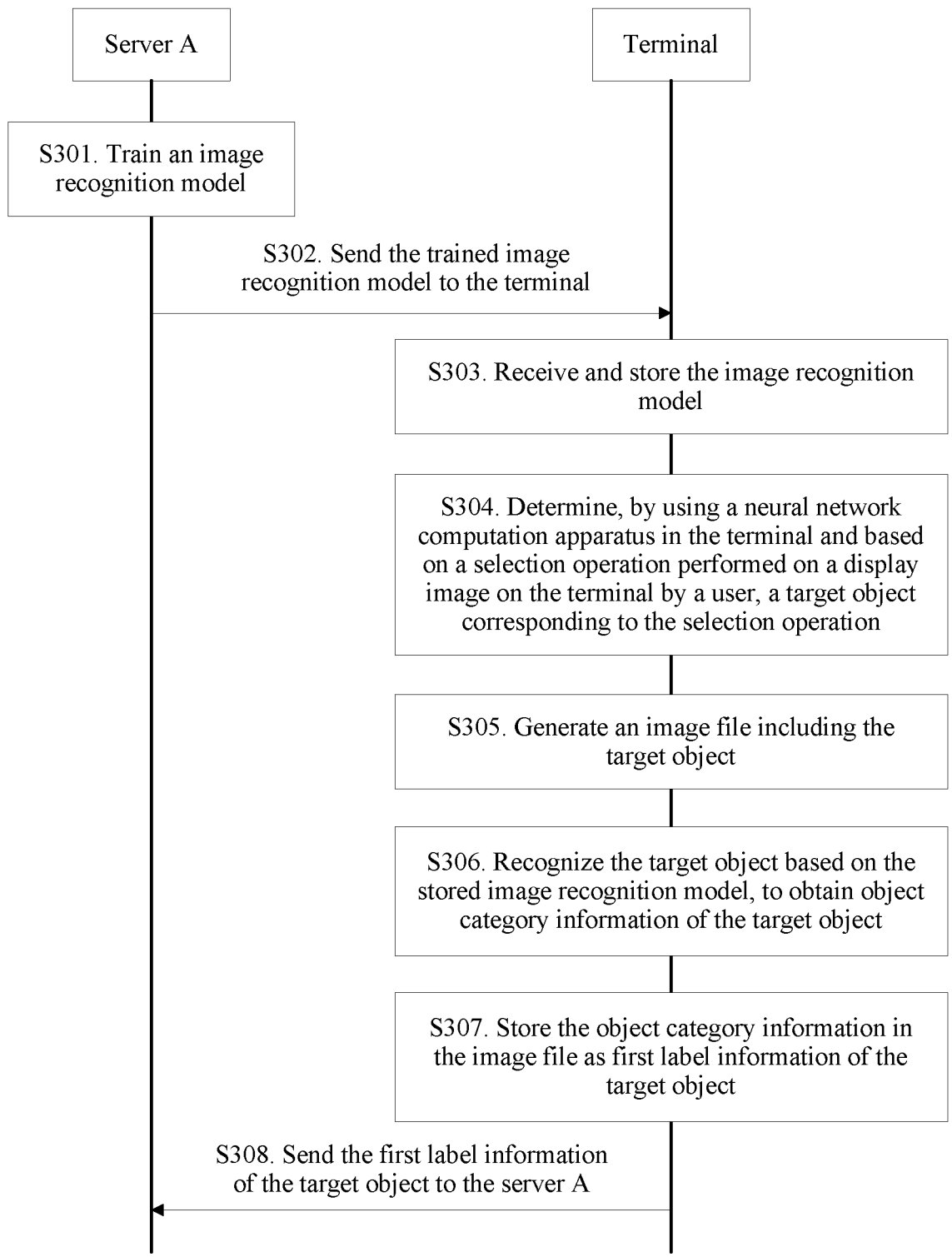
FIG. 3 is a schematic flowchart of another image recognition method according to an embodiment of the present invention.

Referring to FIG. 3, FIG. 3 is a schematic flowchart of another image recognition method according to an embodiment of the present invention. As shown in FIG. 3, the method includes at least the following steps.

Step S301: A server A trains an image recognition model.

In some feasible implementations, the server A may train the image recognition model by using a video file of a mobile phone or a graphics file of a mobile phone. Optionally, the image recognition model may be a convolutional neural network (Convolutional Neural Network, CNN) model. The server A may collect various multimedia files (such as a video file, an image file, or another file including a display image) in an off-line (for example, by means of manual collection in a background) or online manner, and use the various multimedia files as training materials.

Step S302: The server A sends the trained image recognition model to a terminal.

In some feasible implementations, the server A may send the trained image recognition model to the terminal. Specifically, the server may send the image recognition model to the terminal as a file in a specific format. The specific format may be known by the server and the terminal. Therefore, after receiving the file in the specific format, the terminal may recognize the file in the specific format, and store the image recognition model. Optionally, after receiving a request of the terminal, the server A may send the image recognition model to the requesting terminal. Alternatively, after training the foregoing image recognition model, the server A may send the image recognition model to all or some terminals in a system. Alternatively, after training the foregoing image recognition model, the server A may perform broadcast notification to a terminal in a system, and after receiving a response of the terminal in the system, the server A sends the image recognition model to the responding terminal in the system.

Step S303: The terminal receives and stores the image recognition model.

In some feasible implementations, the terminal may receive the image recognition model sent by the server A, and store the image recognition model in a memory of the terminal. After an image file including a target object is obtained, the image recognition model may be invoked from the memory of the terminal.

Step S304: The terminal determines, based on a selection operation performed on a display image on the terminal by a user, a target object corresponding to the selection operation.

In some feasible implementations, the terminal may display an image file, a video file, or the like on the display interface; may detect a touch operation performed on a current display image on the display interface by the user; and when detecting that the touch operation performed on the display image on the terminal by the user is the selection operation, may determine the target object corresponding to the selection operation. Optionally, the detected selection operation may be performed on the display image by the user one or more times. When the selection operation performed on the display image by the user is detected, the selection operation may correspond to one or more target objects. The one or more target objects may be determined based on an image region selected by means of the selection operation.

Figure 6:
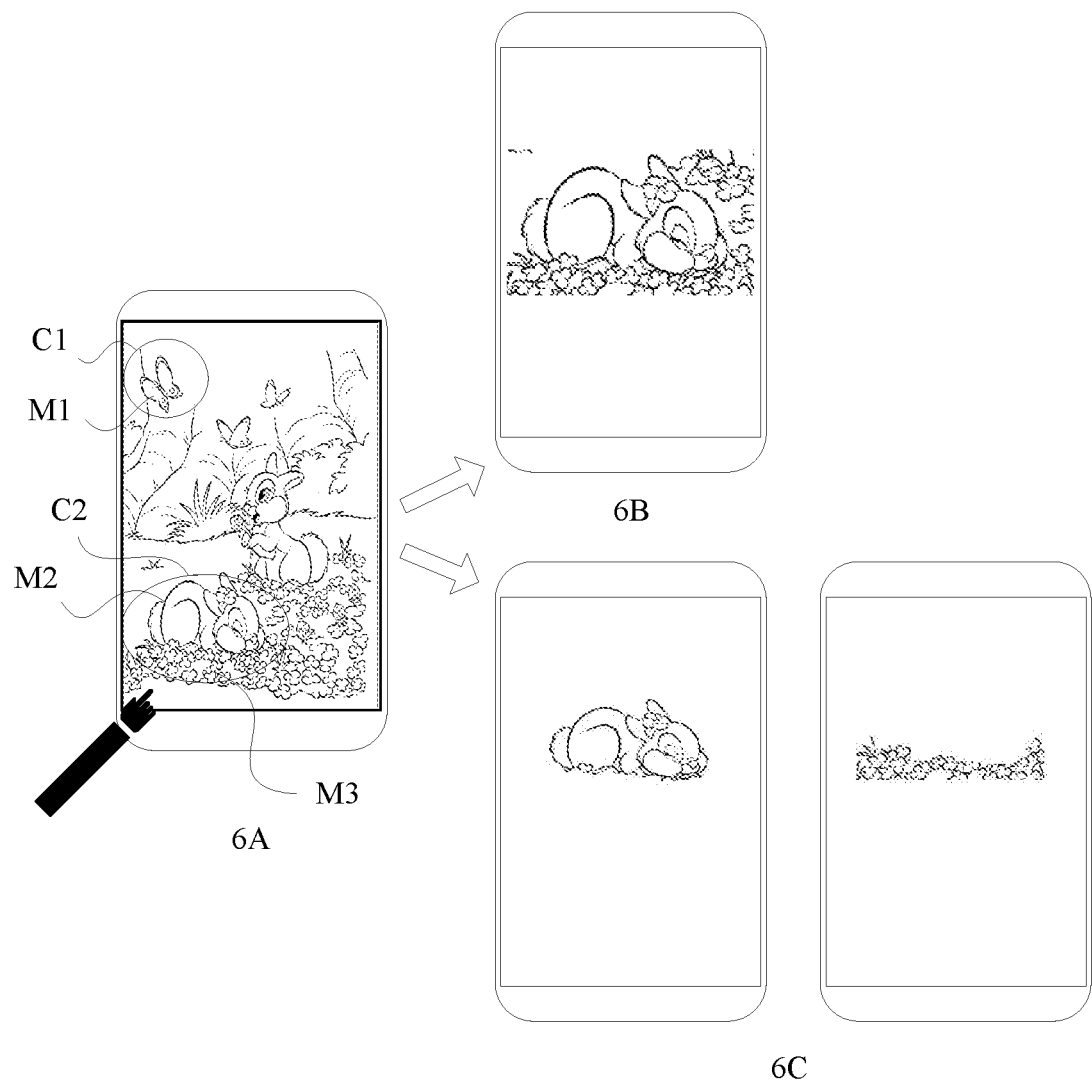
FIG. 6 is a schematic diagram of a terminal display interface according to an embodiment of the present invention.

For example, referring to FIG. 6, FIG. 6 is a schematic diagram of a terminal display interface according to an embodiment of the present invention. As shown in FIG. 6A, when it is detected that a selection region corresponding to a selection operation of a user is C1, it may be determined that a target object is M1; or when it is detected that a selection region corresponding to a selection operation of a user is C2, it may be determined that target objects are M2 and M3.

Step S305: The terminal generates an image file including the target object.

In some feasible implementations, after a target object in an image corresponding to the selection operation is determined, the terminal may generate the image file including the target object. Optionally, different quantities of image files including the target object may be correspondingly generated based on a quantity of target objects in the selected image. For example, one image file may include a plurality of target objects, or one graphics file may include only one target object.

For example, when determining that the selection region corresponding to the selection operation of the user on the display interface is C2, the terminal may generate a new image file including a target object. As shown in FIG. 6B, the image file includes both the target object M2 and the target object M3. Alternatively, as shown in FIG. 6C, two image files are generated based on a quantity of target objects, and the two image files in FIG. 6C respectively include the target object M2 and the target object M3.

Step S306: The terminal recognizes the target object based on the stored image recognition model by using a neural network computation apparatus in the terminal, to obtain object category information of the target object.

In some feasible implementations, after the terminal generates the image file including the target object, the terminal may recognize the target object based on the stored image recognition model by using the neural network computation apparatus in the terminal, to obtain the object category information of the target object. Optionally, after the terminal generates the image file including the target object, the terminal may input, as input data by using the neural network computation apparatus, the image file to the image recognition model stored by the terminal, where the target object in the image file may be extracted by the image recognition model by means of calculation in the neural network computation apparatus; performs classification and recognition on the target object; and finally outputs the object category information of the target object. The terminal may output the object category information of the target object at an output end of the image recognition model. The object category information may include an object category of the target object, an object name of the target object, or the like.

Step S307: The terminal stores the object category information in the image file as first label information of the target object.

In some feasible implementations, after the terminal recognizes the target object based on the image recognition model, to obtain the object category information of the target object, the terminal may store the object category information in the image file as the first label information of the target object. The object category information obtained by the terminal may be stored based on a preset label format.

For example, when an object category of the target object obtained by the terminal is an animal, and an object name is a rabbit, the object category information may be converted into the first label information based on the following preset label format.

In this embodiment of the present invention, a label format may include but is not limited to the following label formats:

<xml>
<category> animal </category>
<Name> rabbit </name>
</xml>

Optionally, after converting the object category information into the first label information based on the foregoing label format, the terminal may store the first label information in an extension segment or a comment segment of the image file. An image file in a JPEG (Joint Photographic Experts Group) format is used as an example. In the image file in the JPEG format, 0xFF0 to 0xFFD are a pre-reserved extension (Extension) segment, and 0xFFE is a pre-reserved comment (Comment) segment. In this case, the terminal may store the first label information in either of the foregoing two segments of the image file including the target object. Certainly, if the image file is in another format, for example, a PNG (Portable Network Graphic Format, image file storage format), the terminal may store the first label information in a corresponding segment in the another format. This embodiment of the present invention imposes no limitation.

Optionally, the first label information may be displayed on the image file based on a preset label display format.

Optionally, the first label information may be alternatively displayed, based on a preset label display format, on an original image or a video file in which the user does not perform the selection operation.

Figure 7:
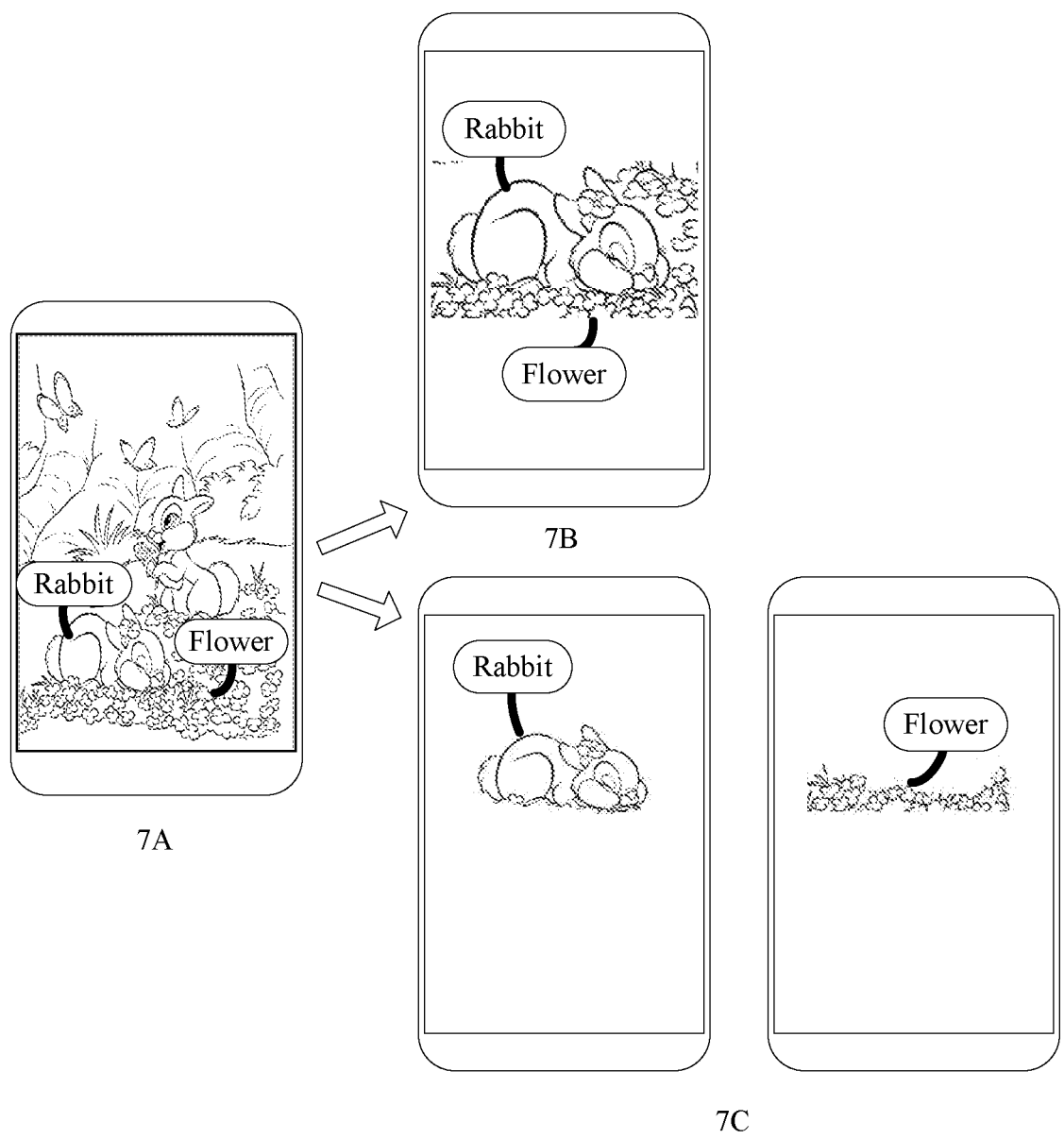
FIG. 7 is a schematic diagram of another terminal display interface according to an embodiment of the present invention.

For example, referring to FIG. 7, FIG. 7 is a schematic diagram of another terminal display interface according to an embodiment of the present invention. As shown in FIG. 7B or FIG. 7C, when one or more image files including a target object are generated, the target object in the image file may be labeled, and reference may be made to FIG. 7B or FIG. 7C for specific label information; or a target object in the original image may be labeled, and reference may be made to label information in FIG. 7A for specific label information.

Step S308: The terminal sends the first label information of the target object to the server A, to share the first label information on the server A.

In some feasible implementations, the terminal may further send the obtained first label information to the server A, to share the first label information on the server A; or optionally, the terminal may send the object category information to the server A. The terminal may further send, to the server A, the image file that includes the target object and in which the first label information is stored. The server A may store a recognition result of image recognition performed by the terminal, that is, the object category information or the first label information of the target object sent by the terminal. When another terminal requests the server to recognize a same target object, the server may feed back, to the another terminal, the object category information or the first label information uploaded by the terminal, to share an image recognition result. In addition, the server A may be prevented from recognizing the target object for a plurality of times by using the image recognition model, so as to improve image recognition efficiency.

Optionally, before sending the first label information of the target object to the server A, the terminal may revise or calibrate the first label information. For example, after the first label information is displayed on the image file, if a recognition result of an image recognition module is incorrect, that is, the first label information is inaccurate, a revision operation performed on the first label information by the user may be received, and the first label information may be revised based on the revision operation, so that the first label information is more accurate. Therefore, the revised first label information is sent to the server A, so that a process of revising label information by the server A in a background can be avoided, thereby improving the image recognition efficiency. Alternatively, after sending the first label information of the target object to the server A, the terminal may receive the revised label information that is fed back for the first label information by the server A. Therefore, the terminal may perform revision by using an image recognition result of the server A, so that the terminal can obtain a more accurate image recognition result.

In this embodiment of the present invention, the terminal may receive and store the image recognition model trained by the server, recognize, based on the image recognition model sent by the server, an image including a target object in the terminal, to obtain the object category information of the target object, and may use the object category information as the first label information to label the target object, or may send the first label information to the server for sharing on the server. Therefore, the terminal can share a workload of image recognition performed by the server, so as to improve the image recognition efficiency.

Figure 4:
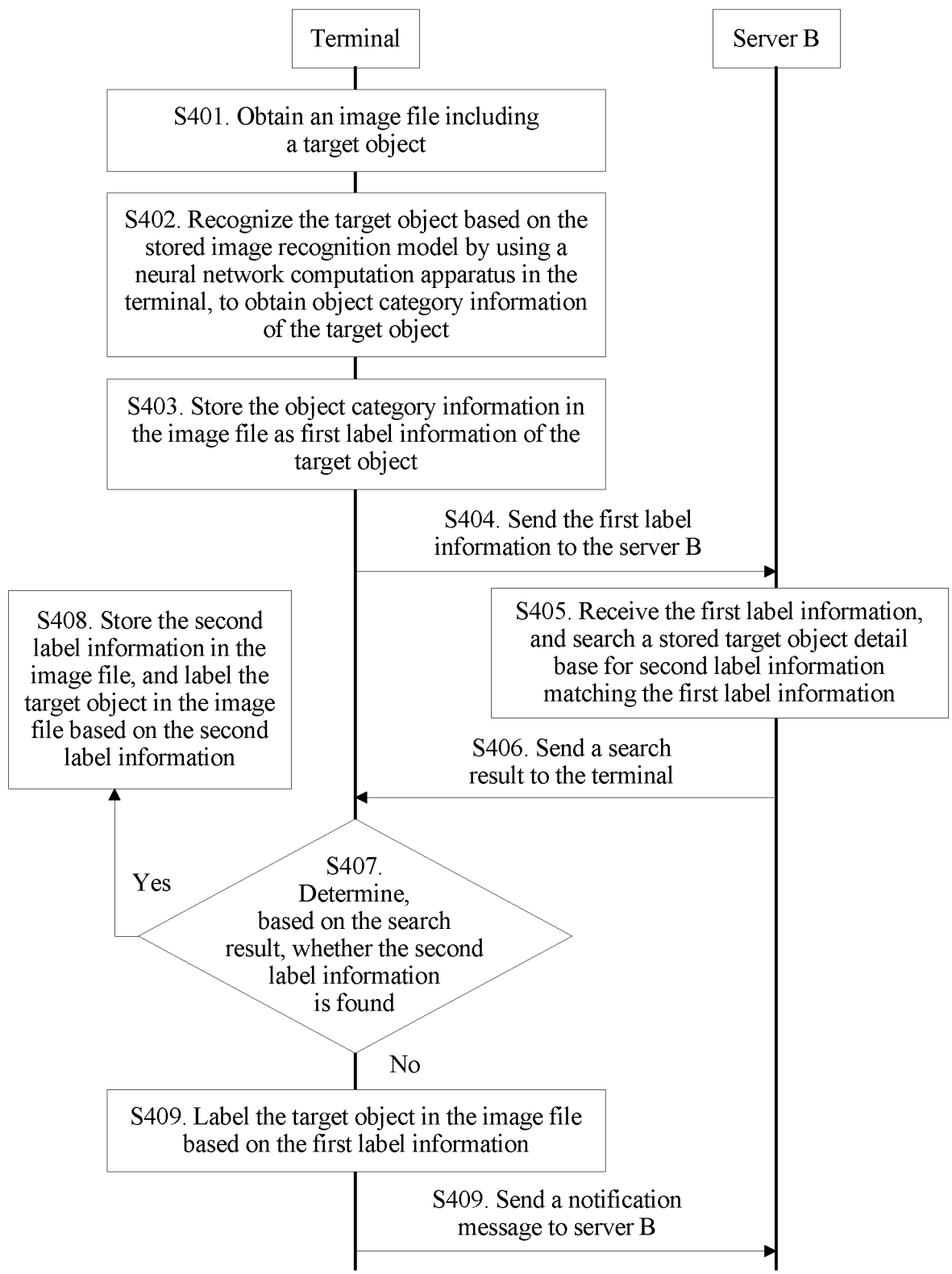
FIG. 4 is a schematic flowchart of still another image recognition method according to an embodiment of the present invention.

Referring to FIG. 4, FIG. 4 is a schematic flowchart of still another image recognition method according to an embodiment of the present invention. As shown in FIG. 4, the method includes the following steps.

Step S401: A terminal obtains an image file including a target object.

Step S402: The terminal recognizes the target object based on an image recognition model in the terminal by using a neural network computation apparatus in the terminal, to obtain object category information of the target object.

Step S403: The terminal stores the object category information in the image file as first label information of the target object.

In some feasible implementations, for specific implementations of step S401 to step S403, reference may be made to specific implementations of corresponding steps in the embodiment shown in FIG. 2 or FIG. 3, and details are not described herein again.

Step S404: The terminal sends the first label information to a server B.

In some feasible implementations, after determining the first label information of the target object, the terminal may send the first label information to the server B. Optionally, the terminal sends a query request to the server B. The query request carries the first label information. The terminal requests, by sending the query request, the server B to search for the second label information matching the first label information. The second label information includes more detailed target object description information.

Step S405: The server B receives the first label information, and searches a stored target object detail base for second label information matching the first label information.

In some feasible implementations, after receiving the first label information, the server B may search the stored target object detail base for the second label information matching the first label information. Specifically, the server B may pre-establish an object detail base. The object detail base includes object details. Different object categories may correspond to different object details. For example, when an object is a plant or an animal, the object details may include but are not limited to information such as an object name, a scientific name, an English name, a subject, a habitat, and a characteristic. When an object is a commodity, the object details may include but are not limited to information such as an object name, a category, a production place, and a manufacturer. The server B may find, in the detained object information base based on an object category or an object name in the first label information, whether second label information matching the object category or the object name in the first label information exists. If a plurality of pieces of label information matching the object category or the object name in the first label information are found, second label information matching a display image of the target object corresponding to the first label information may be obtained by means of screening from the plurality of pieces of label information based on a specific display image of the target object.

Step S406: The server B sends a search result to the terminal.

In some feasible embodiments, the server B may determine the search result in the target object detail base. The search result may include that the second label information is found or the second label information is not found. After finding the second label information, the server may add the second label information to the search result, and send the second label information to the terminal.

Step S407: The terminal determines, based on the search result, whether the second label information is found.

In some feasible embodiments, the terminal may receive the search result sent by the server B, and may determine, based on the search result, whether the second label information matching the first label information is found. Specifically, the terminal may determine, by parsing whether the search result carries the second label information, whether the second label information is found. If the search result does not carry the second label information, the terminal may determine that the second label information is not found. Alternatively, the terminal and the server B may agree that different values carried in the search result indicate different search results. If a value carried in the search result is 0, it indicates that the second label information is not found; or if a value carried in the search result is 1, it indicates that the second label information is found. In this case, when the received search result is 1, the terminal may further request the second label information from the server.

Step S408: If the determining result of the terminal is yes, the terminal stores the second label information in the image file, and labels the target object in the image file based on the second label information.

In some feasible implementations, after determining that the second label information is found, the terminal may further store the second label information in the image file including the target object. For a specific implementation of storing the second label information, refer to an implementation of storing the first label information. The first label information and the second label information may be stored in a same extension segment or a same comment segment of the image file; or the first label information and the second label information are respectively stored in an extension segment and a comment segment of the image file.

Optionally, the stored first label information or the stored second label information may be labeled on the target object of the image file. In this embodiment of the present invention, after determining that the second label information is found, the terminal may label the second label information to the target object of the image file based on a preset label format. A label format of the second label information may be different from a label format of the first label information.

Optionally, the image file may be further labeled by using both the first label information and the second label information.

Figure 8:
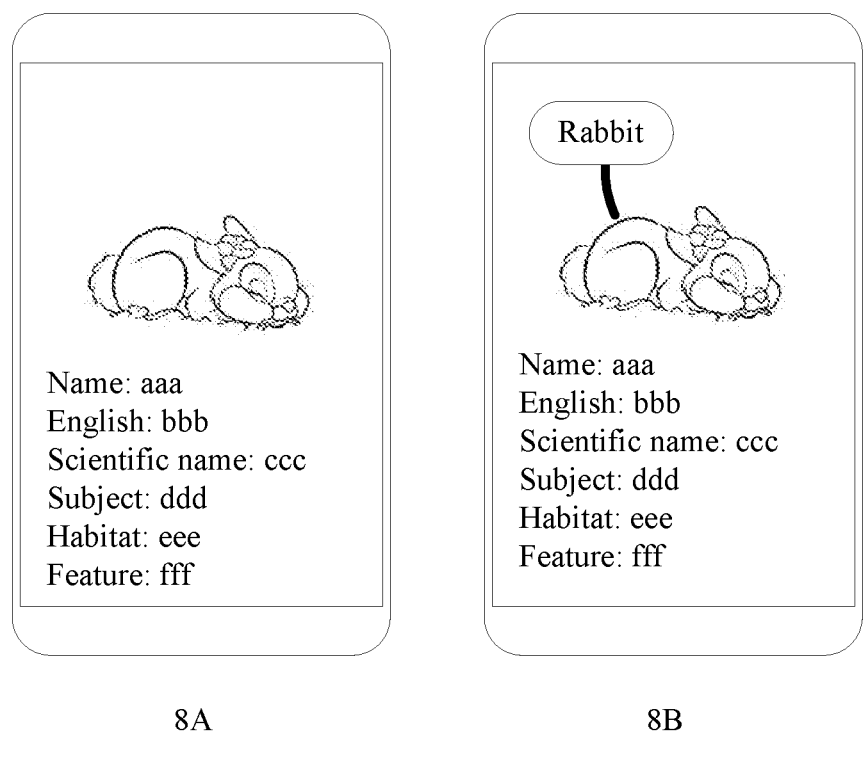
FIG. 8 is a schematic diagram of still another terminal display interface according to an embodiment of the present invention.

For example, referring to FIG. 8, FIG. 8 is a schematic diagram of still another terminal display interface according to an embodiment of the present invention. As shown in FIG. 8A, the target object in the image file is labeled by using the second label information. As shown in FIG. 8B, the target object in the image file may also be labeled by using both the first label information and the second label information.

Step S409: If the determining result of the terminal is no, the terminal labels the target object in the image file based on the first label information, and sends a notification message to the server B, so as to notify the server B of missing, in the target object detail base, the second label information matching the first label information.

In some feasible implementations, after determining that the second label information is not found, the terminal may label the target object in the image file based on the first label information and based on a preset label format; and may notify the server B that the target object detail base stored in the server B does not include the second label information matching the first label information, that is, target object details are missed. Optionally, the terminal may search for the corresponding second label information in another manner (for example, by using a web page), and feed back the second label information to the server B for auditing by the server B. If auditing by the server B succeeds, the terminal feeds back, to the server B, a message acknowledging the second label information; or the server B searches for the second label information itself, and adds the second label information to the target object detail base.

In this embodiment of the present invention, after obtaining the first label information, the terminal may obtain more detailed second label information, so as to label the target object with a plurality of pieces of label information, thereby providing the user with the plurality of pieces of label information, and improving user experience.

Figure 5A:
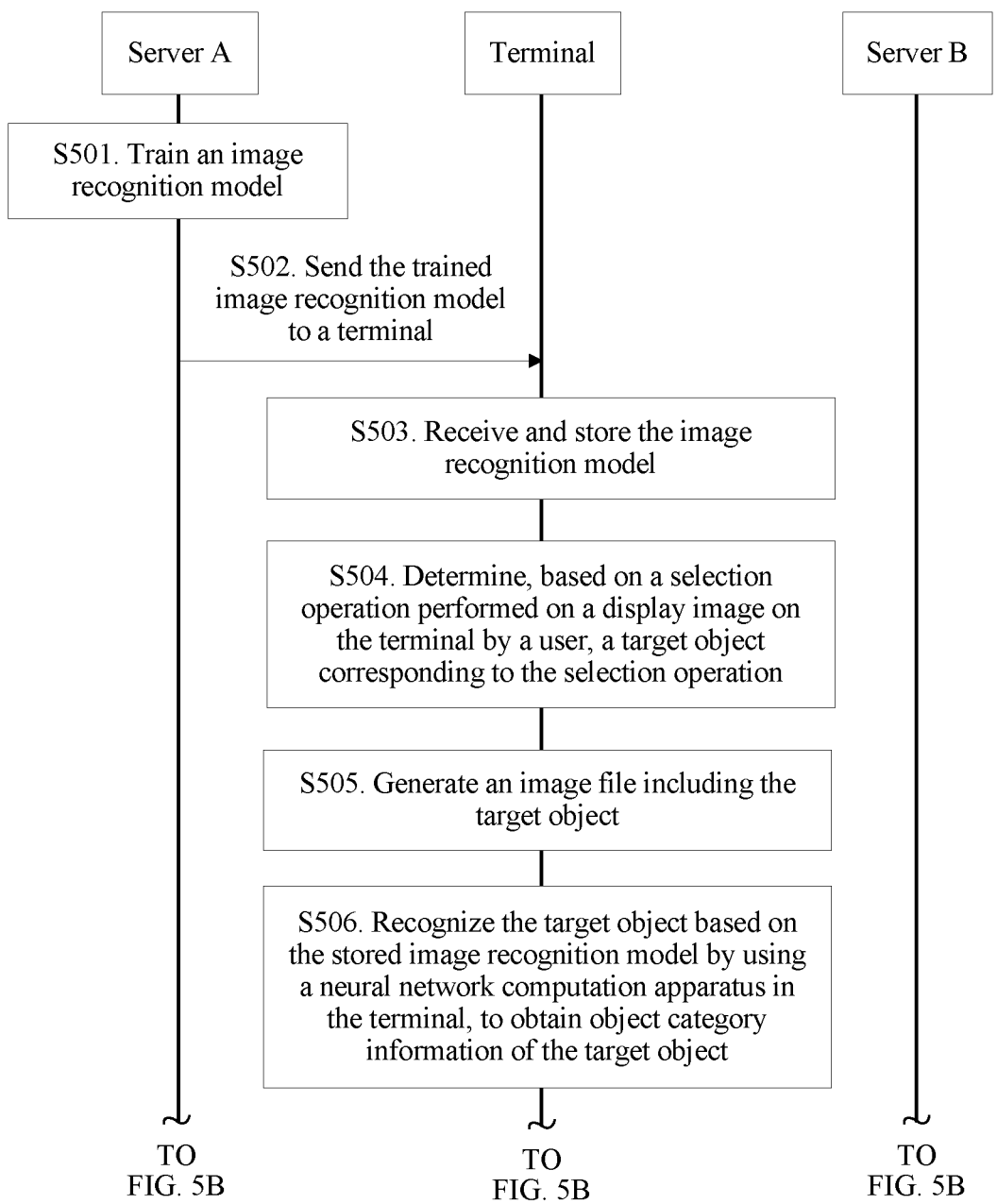
FIG. 5A and FIG. 5B are a schematic flowchart of yet another image recognition method according to an embodiment of the present invention.
Figure 5B:
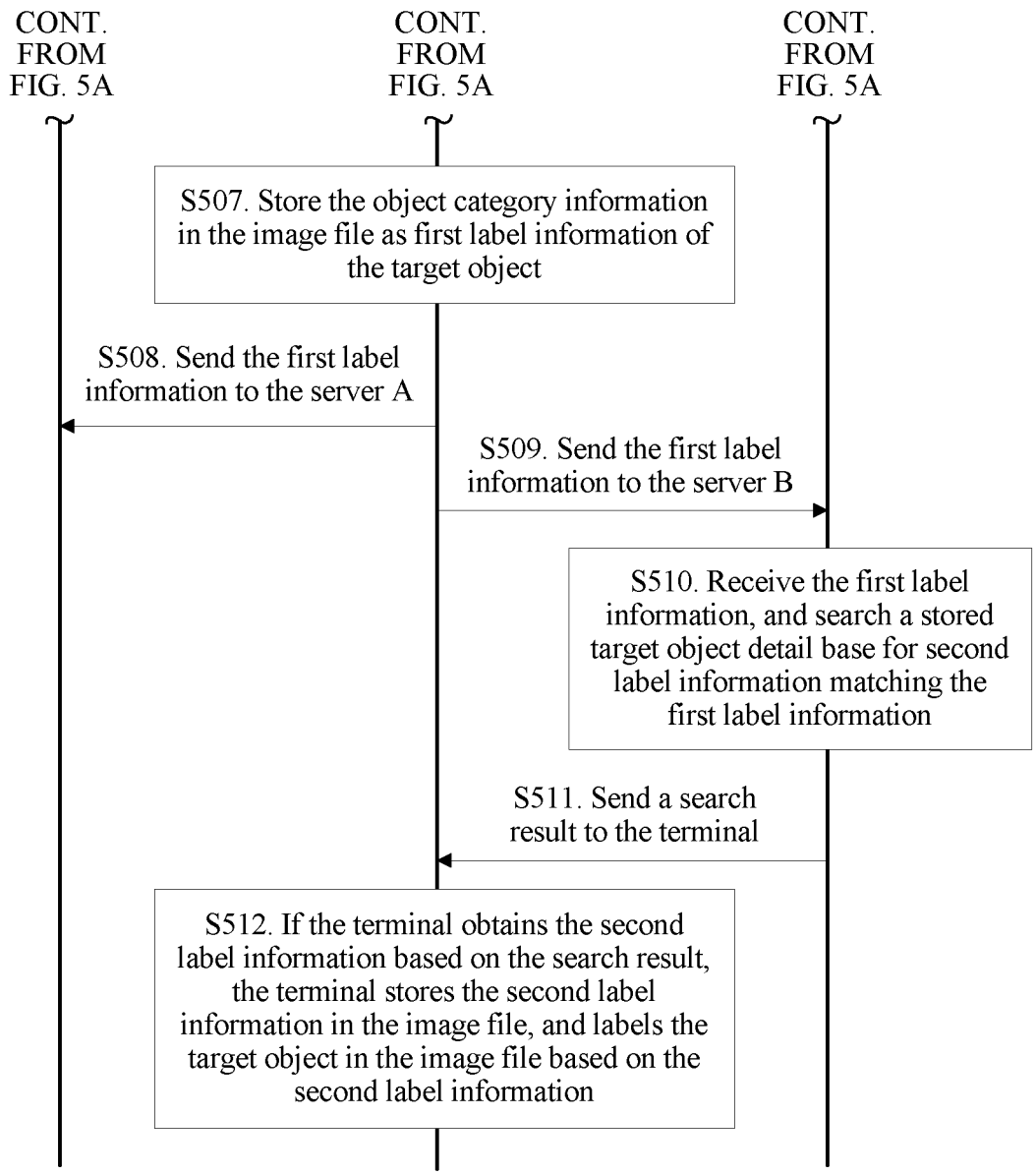

Referring to FIG. 5A and FIG. 5B, FIG. 5A and FIG. 5B are a schematic flowchart of yet another image recognition method according to an embodiment of the present invention. As shown in FIG. 5A and FIG. 5B, the method includes the following steps:

Step S501: A server A trains an image recognition model.

Step S502: The server A sends the trained image recognition model to a terminal.

Step S503: The terminal receives and stores the image recognition model.

Step S504: The terminal determines, based on a selection operation performed on a display image on the terminal by a user, a target object corresponding to the selection operation.

Step S505: The terminal generates an image file including the target object.

Step S506: The terminal recognizes the target object based on the stored image recognition model by using a neural network computation apparatus in the terminal, to obtain object category information of the target object.

Step S507: The terminal stores the object category information in the image file as first label information of the target object.

Step S508: The terminal sends the first label information to the server A, to share the first label information on the server A.

Step S509: The terminal sends the first label information to a server B.

Step S510: The server B receives the first label information, and searches a stored target object detail base for second label information matching the first label information.

Step S511: The server B sends a search result to the terminal.

Step S512: If the terminal obtains the second label information based on the search result, the terminal stores the second label information in the image file, and labels the target object in the image file based on the second label information.

In some feasible implementations, for specific implementations of steps S501 to S511, reference may be made to description of specific implementations of response steps in the embodiment shown in FIG. 2 to FIG. 4, and details are not described herein again. It should be noted that an execution sequence of steps S508 and S509 is not limited in this embodiment of the present invention.

In this embodiment of the present invention, the terminal may obtain label information of the target object in an image by using the image recognition model pushed by the server A, or may obtain more detailed label information of the target object by using the server B, so as to share a workload of image recognition performed by the server, improve image recognition efficiency, and provide the user with a plurality of pieces of label information, thereby improving user experience.

With reference to the foregoing application scenario and the foregoing method embodiment, the following describes the apparatus embodiment in the embodiments of the present invention in detail.

Figure 9:
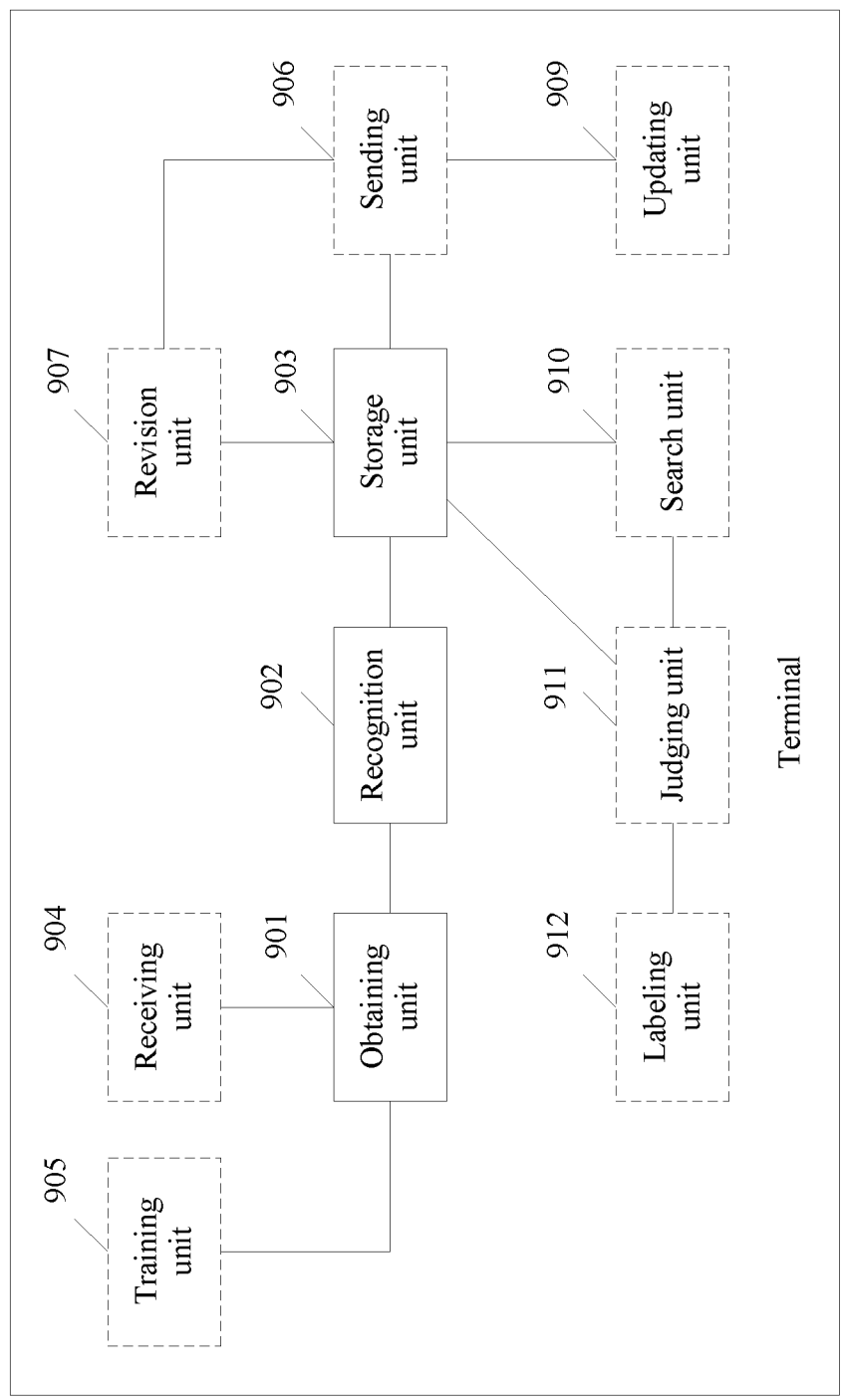
FIG. 9 is a schematic diagram of unit composition of a terminal according to an embodiment of the present invention.

Referring to FIG. 9, FIG. 9 is a schematic diagram of unit composition of a terminal according to an embodiment of the present invention. The terminal 900 may include: an obtaining unit 901, configured to obtain an image file including a target object; a recognition unit 902, configured to recognize the target object based on an image recognition model in the terminal by using a neural network computation apparatus in the terminal, to obtain object category information of the target object; and a storage unit 903, configured to store the object category information in the image file as first label information of the target object.

Optionally, in some feasible implementations, the obtaining unit 901 includes: a determining unit, configured to determine, based on a selection operation performed on a display image on the terminal by a user, a target object corresponding to the selection operation; and a generation unit, configured to generate the image file including the target object.

Optionally, in some feasible implementations, if the selection operation corresponds to n target objects, and n is a positive integer, the generation unit is further configured to: generate an image file including the n target objects; or generate m image files including at least one of the n target objects, where m is an integer, and m≤n.

Optionally, in some feasible implementations, before the recognition unit 902 recognizes the target object based on the image recognition model in the terminal, to obtain the object category information of the target object, the terminal further includes: a receiving unit 904, configured to receive and store the image recognition model sent by a first server; or a training unit 905, configured to perform image recognition training based on a picture in the terminal by using the neural network computation apparatus, to obtain the image recognition model.

Optionally, in some feasible implementations, after the storage unit 903 stores the object category information in the image file as the first label information of the target object, the terminal further includes: a sending unit 906, configured to send the first label information of the target object to the first server, to share the first label information on the first server.

Optionally, in some feasible implementations, before the sending unit 906 sends the first label information of the target object to the first server, the terminal further includes: a revision unit 907, configured to revise the first label information based on a revision operation performed by the user for the first label information.

The sending unit 906 is further configured to: send the revised first label information to the first server.

Optionally, in some feasible implementations, after the sending unit 906 sends the first label information of the target object to the first server, the terminal further includes: an updating unit 908, configured to: if the terminal receives first label revision information sent by the first server, update the first label information with the first label revision information.

Optionally, in some feasible implementations, after the storage unit 903 stores the object category information in the image file as the first label information of the target object, the terminal further includes: a search unit 909, a judging unit 910, and a labeling unit 911.

The search unit 909 is configured to search a target object detail base for second label information matching the first label information.

The judging unit 910 is configured to determine whether the second label information is found.

The storage unit 903 is further configured to: if a determining result of the judging unit is yes, store the second label information in the image file, and label the target object in the image file based on the second label information.

The labeling unit 911 is configured to: if the determining result of the judging unit is no, label the target object in the image file based on the first label information.

In this embodiment of the present invention, the obtaining unit 901 is configured to perform the method of step S201 in the embodiment shown in FIG. 2. The recognition unit 902 is configured to perform the method of step S202 in the embodiment shown in FIG. 2. The storage unit 903 is configured to perform the method of step S203 in the embodiment shown in FIG. 3. In this embodiment of the present invention, the receiving unit 904 is configured to perform the method of step S303 in the embodiment shown in FIG. 3. The obtaining unit 901 is further configured to perform the methods of steps S304 to S305 in the embodiment shown in FIG. 3. The recognition unit 902 is further configured to perform the method of step S306 in the embodiment shown in FIG. 3. The storage unit 903 is further configured to perform the method of step S307 in the embodiment shown in FIG. 3. The sending unit 906 is configured to perform the method of step S308 in the embodiment shown in FIG. 3.

In this embodiment of the present invention, the obtaining unit 901 is further configured to perform the method of step S401 in the embodiment shown in FIG. 4. The recognition unit 902 is further configured to perform the method of step S402 in the embodiment shown in FIG. 4. The storage unit 903 is further configured to perform the method of step S403 in the embodiment shown in FIG. 4. The sending unit 907 is further configured to perform the method of step S404 in the embodiment shown in FIG. 4. The judging unit 910 is configured to perform the method of step S407 in the embodiment shown in FIG. 4. The storage unit 903 is further configured to perform the method of step S408 in the embodiment shown in FIG. 4. The labeling unit 911 is configured to perform the methods of steps S408 and S409 in the embodiment shown in FIG. 4.

In this embodiment of the present invention, the receiving unit 904 is further configured to perform the method of step S503 in the embodiment shown in FIG. 5A and FIG. 5B. The obtaining unit 901 is further configured to perform the methods of steps S504 and S505 in the embodiment shown in FIG. 5A and FIG. 5B. The recognition unit 902 is further configured to perform the method of step S506 in the embodiment shown in FIG. 5A and FIG. 5B. The storage unit 903 is further configured to perform the method of step S507 in the embodiment shown in FIG. 5A and FIG. 5B. The sending unit 907 is further configured to perform the methods of steps S508 and S509 in the embodiment shown in FIG. 5A and FIG. 5B. The labeling unit 911 is further configured to perform the method of step S512 in the embodiment shown in FIG. 5A and FIG. 5B.

In this embodiment of the present invention, the sending unit 907 may send a message, information, or the like to the server or another communications device by using a communications interface disposed on the terminal 900. The receiving unit 904 may receive, by using the communications interface disposed on the terminal 900, a message, information, or the like sent by the terminal or the another communications device. The foregoing communications interface is a wireless interface.

Referring to the foregoing embodiment, the terminal 900 in the embodiment shown in FIG. 9 is presented in a form of a unit. The "unit" herein may refer to an application-specific integrated circuit (application-specific integrated circuit, ASIC), a processor or a memory that executes one or more software or firmware programs, an integrated logic circuit, and/or another component that may provide the foregoing function.

Figure 10:
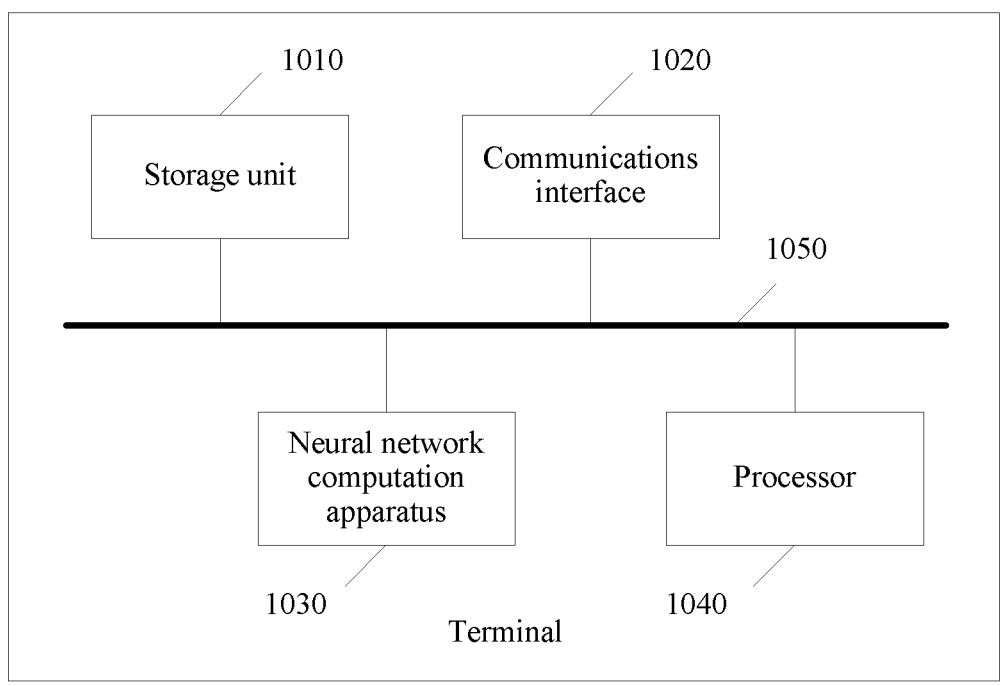
FIG. 10 is a schematic structural diagram of a terminal according to an embodiment of the present invention.

Referring to FIG. 10, FIG. 10 is a schematic structural diagram of a terminal according to an embodiment of the present invention. A terminal 1000 includes: a storage unit 1010, a communications interface 1020, a neural network computation apparatus 1030, and a processor 1040 that is coupled to the storage unit 1010 and the communications interface 1020. The storage unit 1010 is configured to store an instruction. The processor 1040 is configured to execute the instruction. The communications interface 1020 is configured to communicate with another device under control of the processor 1040. When executing the instruction, the processor 1040 may perform any image recognition method in the foregoing embodiment of this application based on the instruction.

The neural network computation apparatus 1030 may include one or more neural network computation chips, for example, at least one of a DSP (Digital Signal Process, digital signal processing) chip, an NPU (Network Process Unit, network process unit), or a GPU (Graphic Process Unit, graphics processing unit).

The processor 1040 may also be referred to as a central processing unit (CPU, Central Processing Unit). The storage unit 1010 may include a read-only memory and a random access memory, and provides the processor 1040 with an instruction, data, and the like. A part of the storage unit 1010 may further include a nonvolatile random access memory. In specific application, components of the terminal 1000 are coupled together by using a bus system. In addition to a data bus, the bus system may further include a power bus, a control bus, a status signal bus, and the like. However, for clarity of description, various buses are marked as a bus system 1050 in the figure. The methods disclosed in the foregoing embodiments of the present invention may be applied to the processor 1040, or implemented by the processor 1040. The processor 1040 may be an integrated circuit chip, and has a signal processing capability. In an implementation process, all steps in the foregoing methods may be completed by using an integrated logic circuit of hardware in the processor 1040 or an instruction in a form of software. The processor 1040 may be a general purpose processor, a digital signal processor, an application-specific integrated circuit, a field-programmable gate array or another programmable logic component, a discrete gate or a transistor logic device, or a discrete hardware component. The processor 1040 may implement or perform the methods, the steps, and the logical block diagrams disclosed in the embodiments of the present invention. The general purpose processor may be a microprocessor, or the processor may also be any conventional processor, or the like. The steps of the methods disclosed in the embodiments of the present invention may be directly performed by a hardware decoding processor, or performed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the storage unit 1010. For example, the processor 1040 may read information in the storage unit 1010, and complete the steps of the foregoing method in combination with hardware of the storage unit.

An embodiment of the present invention further provides a computer storage medium, configured to store a computer software instruction used by the micro base station, and the computer storage medium includes a computer program used to perform the foregoing method embodiment.

Although the present invention is described with reference to the embodiments, in a process of implementing the present invention that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. In addition, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely example description of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A terminal, comprising:
   a processor configured to:
   obtain a first image file comprising a target object; and
   recognize the target object based on an image recognition model in the terminal to obtain object category information of the target object;
   a storage coupled to the processor and configured to store the object category information as first label information of the target object, the terminal further comprising a receiver coupled to the processor, wherein before recognizing the target object based on the image recognition model in the terminal, either:
   the receiver is configured to receive and the processor is configured to store the image recognition model from a server; or
   the processor is further configured to perform image recognition training based on a picture in the terminal to obtain the image recognition model;
   wherein the transmitter is further configured to send the first label information to the server to share the first label information on the server;
   wherein the processor is further configured to revise the first label information based on a revision operation received from a user for the first label information; and
   a transmitter coupled to the processor and configured to send revised first label information to the server.

2. The terminal of claim 1, wherein the processor is further configured to:
   receive, from a user, a selection operation on a display image on the terminal;
   determine, based on the selection operation, the target object corresponding to the selection operation; and
   generate the first image file comprising the target object, wherein when the selection operation corresponds to n target objects and when n is a positive integer, the processor is further configured to:
   generate a second image file comprising the n target objects; or
   generate m image files comprising at least one of the n target objects, wherein m is an integer, and wherein m≤n.

3. The terminal of claim 1, wherein the receiver is further configured to receive first label revision information from the server, and wherein the processor is further configured to update the first label information with the first label revision information.

4. The terminal of claim 1, wherein the processor is further configured to:
search a target object detail base for second label information matching the first label information; and
determine whether the second label information is found, wherein the storage is further configured to:
store the second label information and label the target object based on the second label information when the second label information is found; and
label the target object based on the first label information when the second label information is not found.

5. The terminal of claim 1, wherein the image recognition model is a convolutional neural network model.

6. The terminal of claim 1, wherein the first label information is stored in a comment segment of an image file.

7. The terminal of claim 1, wherein the first label information is stored in an extension segment of an image file.

8. An image recognition method implemented by a terminal, wherein the image recognition method comprises:
obtaining a first image file comprising a target object;
recognizing the target object based on an image recognition model in the terminal to obtain object category information of the target object;
storing the object category information as first label information of the target object;
wherein before recognizing the target object, the image recognition method further comprises:
receiving and storing the image recognition model from a server; or
performing image recognition training based on a picture in the terminal to obtain the image recognition model,
wherein after storing the object category information, the image recognition method further comprises sending the first label information to the server to share the first label information on the server;
revising the first label information based on a revision operation received from a user for the first label information; and
sending revised first label information to the server.

9. The image recognition method of claim 8, wherein obtaining the first image file comprises:
receiving, from a user, a selection operation on a display image on the terminal;
determining, based on the selection operation, the target object corresponding to the selection operation; and
generating the first image file comprising the target object,
wherein when the selection operation corresponds to n target objects and when n is a positive integer, generating the first image file comprises:
generating a second image file comprising the n target objects; or
generating m image files comprising at least one of the n target objects, wherein m is an integer, and wherein m≤n.

10. The image recognition method of claim 8, further comprising: receiving first label revision information from the server; and updating the first label information with the first label revision information.

11. The image recognition method of claim 8, further comprising:
searching a target object detail base for second label information matching the first label information;
determining whether the second label information is found;
storing the second label information and labeling the target object based on the second label information when the second label information is found; and
labeling the target object based on the first label information when the second label information is not found.

12. The image recognition method of claim 8, wherein the object category information comprises text information of the target object.

13. The image recognition method of claim 8, wherein the object category information comprises an object name of the target object.

14. The image recognition method of claim 8, wherein the object category information is stored in an image file as the first label information.

15. The image recognition method of claim 8, wherein the object category information is stored in an image file based on a preset label information format.

16. The image recognition method of claim 8, wherein the first label information is stored in an extension segment of an image file.

17. The image recognition method of claim 8, wherein the first label information is stored in a comment segment of an image file.

* * * * *